(12) United States Patent
Sanders et al.

(10) Patent No.: US 7,372,574 B2
(45) Date of Patent: May 13, 2008

(54) SYSTEM AND METHOD FOR STABILIZING LIGHT SOURCES IN RESONATOR GYRO

(75) Inventors: Glen A. Sanders, Scottsdale, AZ (US); Lee K. Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 238 days.

(21) Appl. No.: 11/298,439

(22) Filed: Dec. 9, 2005

(65) Prior Publication Data

US 2007/0133003 A1    Jun. 14, 2007

(51) Int. Cl.
*G01C 19/72* (2006.01)

(52) U.S. Cl. ...................................... 356/461

(58) Field of Classification Search ................ 356/461, 356/470
See application file for complete search history.

(56) References Cited

U.S. PATENT DOCUMENTS

| 4,135,822 | A | * | 1/1979 | Ezekiel ........................ 356/461 |
| 4,352,562 | A | * | 10/1982 | Minden ........................ 356/470 |
| 4,702,600 | A | * | 10/1987 | Handrich et al. ............ 356/461 |
| 4,807,999 | A | * | 2/1989 | Soo Hoo ..................... 356/470 |
| 4,863,272 | A | * | 9/1989 | Coccoli ........................ 356/461 |
| 6,765,678 | B2 | * | 7/2004 | Strandjord et al. ......... 356/460 |
| 2004/0061863 | A1 | * | 4/2004 | Digonnet ..................... 356/460 |

* cited by examiner

*Primary Examiner*—Samuel A. Turner
(74) *Attorney, Agent, or Firm*—Black Lowe & Graham, PLLC

(57) ABSTRACT

Methods and apparatus are provided for stabilizing laser light sources of a resonator gyro. A resonator gyro comprises a first light source configured to produce a first input light, a second light source configured to produce a second input light, a resonator coupled to the first and second light sources, a resonance detection circuit coupled to the resonator, and a controller coupled to the resonance detection circuit and the first and second light sources. The resonance detection circuit detects a resonance frequency for each of the counter-propagating directions of the resonator. The controller tunes the first input light to a clockwise resonance frequency, and tunes the second input light to a counter-clockwise resonance frequency. A difference between the resonance frequencies is proportional to a rotational rate of the resonator gyro.

17 Claims, 5 Drawing Sheets

SYSTEM AND METHOD FOR STABILIZING LIGHT SOURCES IN RESONATOR GYRO

FIELD OF THE INVENTION

The present invention generally relates to gyro systems, and more particularly relates to resonance tracking using two or more light sources in resonator gyros and methods for controlling two or more light sources in resonator gyros.

BACKGROUND OF THE INVENTION

Gyros have been used to measure rotation rates or changes in angular velocity about an axis of rotation. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating closed optical path, and the difference in the two pathlengths is proportional to the rotational rate that is normal to the enclosed area.

In a resonator fiber optic gyro (RFOG), the counter-propagating light beams are desirably monochromatic (e.g., in a single frequency) and circulate through multiple turns of the fiber optic coil and for multiple passes through the coil using a device that redirects light that has passed through the coil back into the coil again (i.e., circulates the light) such as a fiber coupler. The beam generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a wavelength λ is referred to as "on resonance" when the round trip resonator pathlength is equal to an integral number of wavelengths. A rotation about the axis of the coil produces a different pathlength for clockwise and counter-clockwise propagation, thus producing a shift between the respective resonance frequencies of the resonator, and the frequency difference, such as may be measured by tuning the CW beam and CCW beam frequencies to match the resonance frequency shift of the closed optical path due to rotation, indicates the rotation rate.

Frequency shifters and phase modulators have been used with the beam generating device (e.g., a laser light source) to modulate and shift the frequencies of each of the counter-propagating light beams so that the resonance frequencies of the resonant coil may be observed. The frequency shifters and phase modulators may be difficult to economically implement particularly for smaller scale applications of the resonator gyro. Furthermore, frequency shifting and modulation imperfections of these devices can limit gyro performance from desirable levels. Alternatively, two tunable lasers may be used for introducing the counter-propagating light beams and for resonance detection without the use of frequency shifters and phase modulators and with potential of improved performance. However, when using two or more tunable lasers for resonance detection, the relative frequency noise between such lasers is typically the greatest contributor to angle random walk (ARW) which decreases the accuracy of the rotation rate measured by the resonator gyro.

In the RFOG, the glass material of the optical fiber may shift the resonance frequencies of the CW and CCW paths and thus produce a false indication of rotation or inaccurate measurement of rotation rate. A reflective mirror may be used to circulate the counter-propagating light beams in the coil multiple times but this typically reduces the signal-to-noise ratio from losses generated at the transition from the mirror to the coil. Additional anomalies that decrease the accuracy of the measurement of the rotational rate may be generated from a non-linear Kerr effect, stimulated Brillouin scattering, polarization errors, and Rayleigh backscatter errors. These error mechanisms are also sensitive to the environment which, for example, gives rise to unwanted temperature sensitivity.

The non-linear Kerr effect occurs when high monochromatic light power inside the RFOG alters the index of refraction of the glass in the optical fiber. A mismatch of intensities of the CW and CCW beams may induce a bias on the observed frequency shifts on the order of several degrees/hour. Stimulated Brillioun scattering (SBS) occurs when a high intensity associated with a high finesse in the fiber resonator causes lasing or stimulated emission in the glass fiber, and this generally promotes large instabilities in the measurement of the resonance frequencies. Polarization-induced errors may result from fiber couplers that incidentally couple light into a second polarization mode, either from one optical fiber to an adjacent optical fiber or within the same fiber. The second polarization mode may resonate to produce an asymmetry in the resonance lineshape of the polarization mode used to measure a rotation. Even though the frequency of the second polarization mode is the same for the CW and CCW beams, the amplitude may be different, thus causing different observations, beyond the affect of rotation, of the resonance frequencies of the CW and CCW beams. Polarization-induced errors may severely limit the accuracy of the RFOG because determination of the resonance centers for each of the resonance frequencies of the CW and CCW beams directly affects the rotational rate measurement. Rayleigh backscatter errors may be a source of drift rate in a resonator gyro. Backscattered light from the glass walls of the fiber or from interfaces with the fiber can interfere with the circulating light beams and cause significant drift rate errors. Selecting an appropriate fiber may eliminate most sources of drift rate in the resonator gyro except optical backscatter errors.

Accordingly, it is desirable to provide a resonator gyro that minimizes optical backscatter errors for high performance applications. In addition, it is desirable to provide a method for determining a rotation rate of a resonator gyro that minimizes optical backscatter errors and frequency noise in the resonator gyro. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods and systems are provided for stabilizing light sources in a resonator gyro. In an exemplary embodiment, a resonator gyro comprises a first light source configured to produce a first input light having a first frequency, a second light source configured to produce a second input light having a second frequency, a resonator coupled to the first and second light sources, a resonance detection circuit coupled to the resonator, and a controller coupled to the resonance detection circuit and the first and second light sources. The resonator has first and second counter-propagating directions and comprises an optical fiber coil having a hollow core. The resonator is configured to circulate light based on the first and second input light through the hollow core in the first and second counter-propagating directions. The resonance detection circuit is configured to detect a resonance frequency for each of the first and second counter-propagating directions. The controller is configured to tune the first frequency to the resonance frequency of the first counter-propagating direction, and tune the second frequency to the resonance frequency of the second counter-propagating direction. A difference between the resonance frequencies of the first and second counter-propagating directions is proportional to a rotational rate of the resonator gyro.

In another exemplary embodiment, a resonator gyro comprises a first light source configured to produce a first input light having a first frequency, a second light source configured to produce a second input light having a second frequency, a third light source configured to produce a third input light having a third frequency, a resonator coupled to the first, second, and third light sources, a tracking circuit coupled to the resonator, and a controller coupled to the tracking circuit and the first, second, and third light sources. The resonator has first and second counter-propagating directions and is configured to circulate a first circulating light based on the first input light in the first counter-propagating direction, circulate a second circulating light based on the second input light in the second counter-propagating direction, and circulate a third circulating light based on the third input light in the second counter-propagating direction. The tracking circuit is configured to detect a first resonance frequency ($f_1$) of the first counter-propagating direction, a second resonance frequency ($f_2$) of the second counter-propagating direction, and a third resonance frequency ($f_3$) of the second counter-propagating direction. The second resonance frequency $f_2$ is one longitudinal mode lower than the first resonance frequency ($f_1$), and the third resonance frequency ($f_3$) is one longitudinal mode higher than the first resonance frequency ($f_1$). The controller is configured to tune the first frequency to the first resonance frequency ($f_1$), tune the second frequency to the second resonance frequency ($f_2$), and tune the third frequency to the third resonance frequency ($f_3$). A difference ($f_3-f_1$)−($f_1-f_2$)= 2 $\Delta f$, and $\Delta f$ is a frequency difference proportional to a rotational rate of the resonator gyro.

In another exemplary embodiment, a method for determining a rotation rate of a resonator gyro is provided comprising the steps of locking a first input light beam to a clockwise resonance frequency of the resonator gyro, locking a second input light beam to a first counter-clockwise resonance frequency of the resonator gyro, and determining a frequency difference between the first and second input light beams, the frequency difference proportional to the rotation rate. The clockwise resonance frequency is on a first longitudinal resonance mode, and the first counter-clockwise resonance frequency is on a second longitudinal resonance mode away from the first longitudinal resonance mode.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
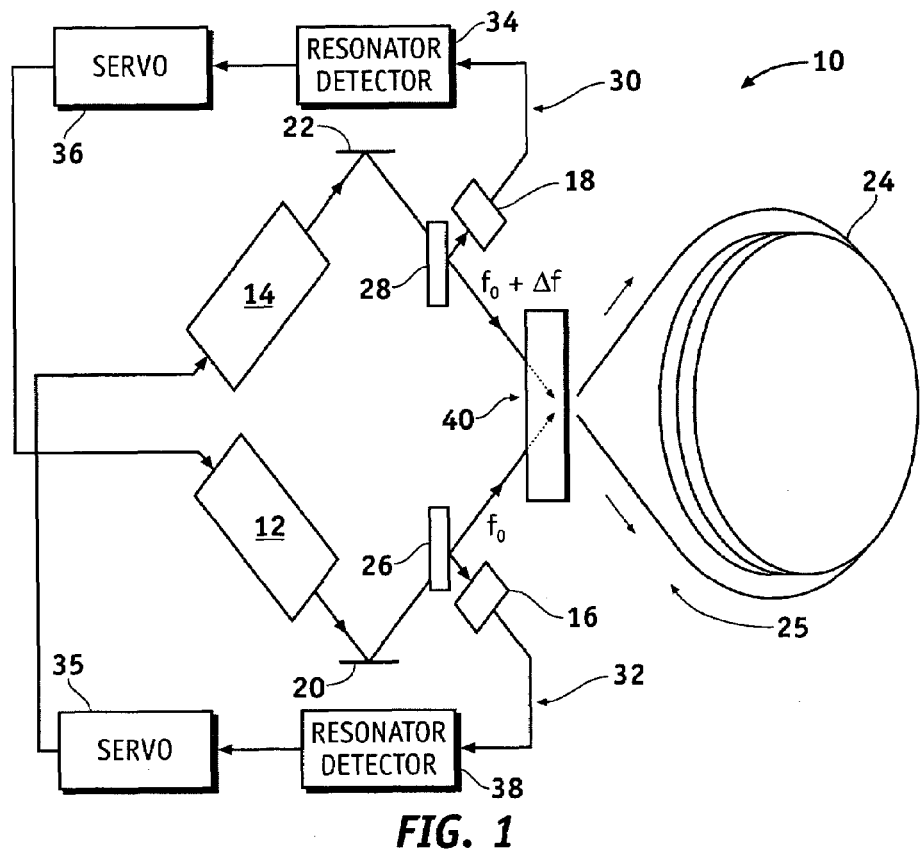
FIG. 1 is a block diagram of a resonator gyro in accordance with an exemplary embodiment of the present invention.

Referring now to the drawings, FIG. 1 is a block diagram of a resonator gyro 10 in accordance with an exemplary embodiment of the present invention. The resonator gyro 10 comprises tunable light sources 12, 14 (e.g., tunable lasers) that synthesize light beams, respectively, a resonator 25 circulating light beams in counter-propagating directions and having a recirculator 40 that introduces a portion of the light beams from the tunable light sources 12, 14 into the resonator 25, photodetectors 16, 18 that sample light circulating in the resonator 25, resonance detectors 34, 38 coupled to the photodetectors 18, 16, respectively, that detect the centers of resonance dips for each of the counter-propagating directions of the resonator 25, and servos 36, 35 having an input coupled to the resonance detectors 34, 38, respectively, and an output coupled to the tunable light sources 14, 22, respectively. These components of the resonator gyro 10 thus form resonance tracking loops 30, 32 for each counter-propagating direction (e.g., CW and CCW).

The light beam produced by the first tunable laser 12 (e.g., CCW laser) is tuned to a frequency $f_0$, and the light beam produced by the second tunable laser 14 (e.g., CW laser) is tuned to a frequency $f_0+\Delta f$. The relative frequency drift and jitter between the two laser frequencies is preferably substantially minimized to a level that minimizes or does not affect the accuracy and stability of the frequency shift, and thus rotational rate, measurement. This can be accomplished by selecting a modulation frequency that is substantially greater than the unity gain frequency for the resonance tracking loops 30, 32, and the modulation frequency is preferably at least about four time the unity gain frequency for the resonance tracking loops 30, 32. Additionally, this can be accomplished by a laser frequency stabilization technique using the servos 36, 35 to lock their beat frequencies to a tunable stable offset that is proportional to rotational rate. Each of the tunable lasers 12, 14 sinusoidally frequency modulates the light beams at the respective frequencies. Additionally, the resonator gyro 10 may include additional mirrors 20, 22 and beam splitters 26, 28 for directing the propagation of light beams from the tunable lasers 12, 14 to the resonator 25 and for directing light from the resonator 25 to the photodetectors 16, 18.

The resonator 25 comprises the recirculator 40 and a hollow core optical fiber coil 24 having first and second ends coupled to the recirculator 40. The recirculator 40 introduces the modulated light beams (e.g., CW and CCW input light beams) into the hollow core of the optical fiber coil 24 and circulates a portion of the modulated light beams through the optical fiber coil 24. The recirculator 40 reintroduces light emerging from one end of the optical fiber coil 24 into the other end of the fiber coil 24, thus causing light to propagate through the fiber coil 24 many times.

After receiving the modulated light beams from the tunable lasers 12, 14, the resonator 14 directs a portion of the two modulated light beams in counter-propagating directions (e.g., CW and CCW directions). By application of the Sagnac Effect, the optical gyro 10 senses a rotation rate about an axis of the optical gyro 10. The photodetectors 18, 16 convert optical signals representing the circulating light beams to electrical signals, and the resonance detectors 34 and 38 detect the resonance centers of the resonance lineshapes for the CW and CCW circulating light beams and determine the resonance frequencies associated with each of the counter-propagating directions of the resonator 25 based on the frequency shift between the detected resonance centers. The frequency shift is used to determine the rotation rate of the optical gyro 10. For example, the first light beam (e.g., a CW beam) has an unshifted laser frequency $f_0$ and is introduced into the resonator 25. For rotation sensing, the frequency $f_0$ of the CW beam is tuned (e.g., by tuning the frequency of the laser 12) to the resonance frequency of the resonator 25 in the CW direction. The second light beam (e.g., a CCW beam) is tuned the frequency $f_0+\Delta f$ to align the CCW beam frequency with a resonance center relative to the resonance frequency of the resonator 25 in the CCW direction.

To measure the resonance center-frequencies in either the CW direction or CCW direction, a standard synchronous detection technique is used. Each input light beam is sinusoidally phase-modulated, and therefore frequency modulated at frequencies $f_m$ and $f_n$, respectively, to dither each input beam frequency across a resonance lineshape as measured by the photodetectors 18, 16. For example, additional circuitry coupled to the photodetectors 18, 16 may demodulate the output of the photodetectors 18, 16 at the frequencies $f_m$ and $f_n$, respectively, to measure resonance centers indicated by the light outputs of the CW and CCW beams. At a line center of the resonance lineshape, or the resonance center, the optical sensor 16 detects a minimum output at the fundamental frequencies $f_m$ and $f_n$, respectively. When the input beam frequency (e.g., $f_0+\Delta f$ or $f_0$) is off-resonance, an error signal at frequencies $f_m$ and $f_n$, respectively, is sensed by the photodetector and used to tune the respective beam frequency to the respective resonance frequency of the resonator 25. The frequency of the CW beam is tuned by changing the frequency, $f_0$, of the laser 12 and the frequency of the CCW beam is adjusted via a feedback loop that changes the frequency shift, $\Delta f$, of the second laser 14 so that $f_0+\Delta f$ matches the CCW resonance frequency of the resonator 25.

When $f_0+\Delta f$ is tuned away from the resonance frequency of the resonator 14 in the CCW direction, the energy from the CCW beam does not produce a maximum intensity at the optical sensor 16. When $f_0+\Delta f$ is tuned at the resonance frequency of the resonator 14 in the CCW direction, the CCW beam has a minimum output, i.e., a resonance dip, thereby indicating the resonance center. Similarly for the CW light beam, the energy of the CW beam enters the fiber optical coil 24 when the CW beam is tuned to the resonance frequency of the resonator 25 in the CW direction.

In the absence of rotation, the round-trip path-lengths of the CW and CCW beams inside the resonator 25 in the CW and CCW direction, respectively, are substantially equal. Thus, $\Delta f$ is tuned to zero by the second laser 14. In the presence of rotation, the round-trip path-lengths differ between the CW and the CCW directions producing a resonance frequency difference between the two directions that is proportional to the rotation rate. By tuning the frequency $f_0$ to track the CW resonance and the frequency $\Delta f$ to track the CCW resonance center, the rotation rate is determined.

The CW and CCW beams propagate through a hollow core, band-gap, optical fiber having an extremely low bend loss, and the coil 24 preferably has a large number of turns about a substantially small area to achieve a compact gyro which is one advantage of this invention. For example, the coil 24 may have from about 20-40 turns of the optical fiber about a one centimeter diameter. The hollow core optical fiber is typically glass-based with a plastic outer jacket and a hollow inner core. In the hollow core optical fiber, light injected from the recirculator 40 traverses mostly through free space (e.g., air or a vacuum) along the core, and only about a few percent or less of the optical energy of light is contained in the glass walls of the fiber surrounding the hollow core. Because a large majority of the light energy traverses through free space along the hollow core of optical fiber, the transition between the recirculator 40 and the hollow core optical fiber has a near-perfect index matching, and a high reflectivity laser mirror with low loss and attractive polarization properties may be used for the recirculator 40. The hollow core fiber is suited to significantly attenuate, or eliminate altogether, the rotation measurement errors commonly associated with the properties of the glass medium in the core of conventional fibers.

The CW resonance tracking loop 30 locks the CW laser 12 onto a CW resonance frequency of the resonator 25, and the CCW resonance tracking loop 32 locks the CCW laser 14 onto a CCW resonance frequency of the resonator 25. The output of each of the resonance detectors 34, 38 is an error signal indicating a laser frequency deviation away from the resonance frequency of the resonator 25. The servos 36, 35 tune the lasers 12, 14 to maintain the error signal, and thus the frequency deviation, at zero.

Frequency noise of many types of lasers consist mostly of white noise, which has a spectral noise density that is constant with frequency. The controlled frequency noise spectral density $S^*_f$ is approximately inversely proportional to the square of the loop gain $G^2$ such that $$S^*_f = \frac{S_f}{G^2} \tag{1}$$

where the loop gain is in terms of amplitude (e.g., voltage gain) and $S_f$ is the uncontrolled frequency noise spectral density of the laser during free running. $S_f$ can be related to the full-width-at-half-max (FWHM) frequency $\Delta v$ of a Lorentzian laser lineshape by $$S_f = \frac{\Delta v}{\pi}. \quad (2)$$

Combining Equations 1 and 2 gives, $$S_f^* = \frac{\Delta v}{\pi G^2} \quad (3)$$

The loop gain is a function of frequency. For a first order loop, such as a loop that involves a single integrator or accumulator for the servo 35, 36, the loop gain increases by about 20 dB per decade of frequency decrease, and the corresponding frequency noise decreases with decreasing frequency. A frequency band at low frequencies may be selected where the loop gain is sufficiently high that the controlled frequency noise has been reduced to insignificant levels, and thus does not contribute to ARW in that frequency band. A possible design criterion for the resonance tracking loops 30, 32 is to match the frequency band of low frequency noise to the frequency band desired for a particular application using the resonator gyro 50. The desired frequency band for most navigation applications is relatively low (e.g., below about 1 Hz). For these applications, the loop gain should be high enough such that the controlled frequency noise is insignificant.

A unity gain frequency of the resonance tracking loops 30, 32 can be derived from the desired loop gain at the maximum frequency in the frequency band for the particular application. For lasers having a free-running linewidth of about 50 kHz, the unity gain frequency should be at about 500 kHz to about 5 MHz to obtain low ARW for a high performance application. Greater increases in the loop gain may result in an unstable resonance tracking loop. Having a resonance tracking loop with only about 20 dB/decade roll off when the loop gain crosses through unity generally provides a stable resonance tracking loop. Any poles in the loop other than the integrator should be at a frequency higher than the unity gain frequency. Since the resonance tracking loop 30, 32 includes components having limited bandwidth, such as the photodetectors 16, 18, secondary poles exist in the loop. Therefore, the bandwidth limitations of the electronic components of the resonance tracking loops 30, 32 limit how much loop gain may be obtained with a stable loop. The signal bandwidth for the components of the resonance tracking loop 30, 32 is preferably greater than the unity gain frequency of the resonance tracking loop 30, 32. For high performance, the bandwidth of the components is substantially greater (e.g., greater than about 20 MHz).

For a stable loop, the modulation frequencies, used for resonance tracking, of the input light beams are substantially greater than the unity gain frequency. Resonance tracking modulation is typically a sinusoid phase or frequency modulation for probing the resonance lineshape. The photodetector signal resulting from the modulation over the resonance lineshape has a sinusoidal component indicating the frequency deviation between the laser frequency and the resonance frequency of the resonator. This sinusoidal component is demodulated by the resonance detectors 34, 35 to provide an error signal to the servos 36, 35, respectively. The demodulator introduces a pole into the feedback loop having a frequency less than the modulation/demodulation frequency. Therefore, for a high gain loop with low frequency noise, the modulation/demodulation frequency should be substantially higher (e.g., greater than 2 MHz or 20 MHz depending on the design) than the unity gain frequency of the resonance tracking loop 30, 32. For high performance, the modulation/demodulation frequency is preferably greater than about four (4) times the unity gain frequency of the resonance tracking loop 30, 32.

Figure 2:
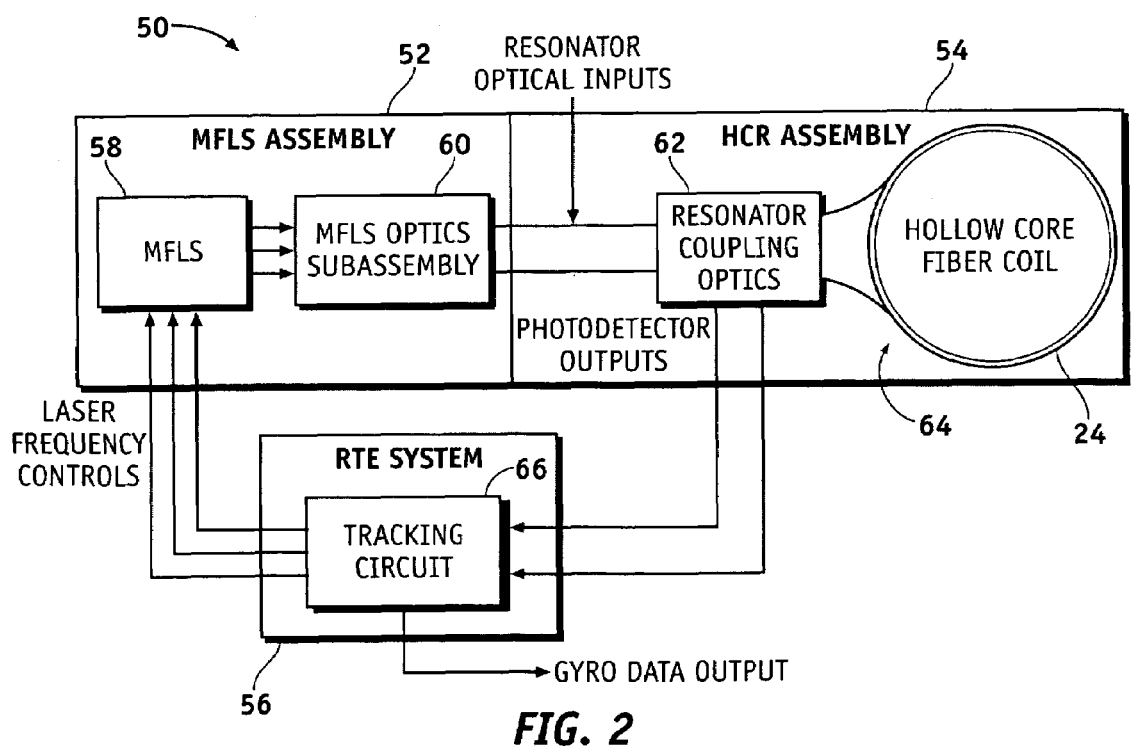
FIG. 2 is a partial schematic diagram of a resonator gyro in accordance with another exemplary embodiment of the present invention.

FIG. 2 is a partial schematic diagram of a resonator gyro 50 in accordance with another exemplary embodiment of the present invention. The resonator gyro 50 comprises a multi-frequency laser source (MFLS) assembly 52, a hollow core resonator (HCR) assembly 54 coupled to an output of the MFLS assembly 52, and a resonance tracking electronics (RTE) system 56 having an input coupled to an output of the HCR assembly 54, a first output coupled to an input of the MFLS assembly 52, and a second output for providing gyro data of the resonator gyro 50. Using a feedback loop from the HCR assembly 54 to the MFLS assembly 52 via the RTE system 56, one or more slave lasers in the MFLS assembly 52 and a master laser in the MFLS assembly 52 are tunable to produce modulated light beams that are locked onto the resonance frequency corresponding to a respective propagation direction in the resonator.

In one exemplary embodiment using one slave laser, the master laser produces a CW beam that is tuned to a resonance frequency of the CW direction of the resonator, and the slave laser produces a CCW beam that is tuned to a resonance frequency of the CCW direction of the resonator. The resonance frequency of the CCW direction is on a different longitudinal resonance mode (e.g., at a resonance frequency that is at least one longitudinal resonance mode away from the resonance frequency of the CW direction) than the resonance frequency of the CW direction. The frequency spacing between adjacent modes is termed the free spectral range (FSR). The difference between the resonance frequencies of the CCW direction and the CW direction produces a beat frequency. To eliminate optical back-scatter errors, two lasers are used that are tuned to frequencies at least one longitudinal resonance mode apart. To remove a large bias and associated bias instabilities (e.g., due to the FSR being part of the measurement), the CCW beam is switched between a CCW resonance frequency that is at least one longitudinal resonance mode lower than the resonance frequency of the CW direction and a CCW resonance frequency that is at least one longitudinal resonance mode higher than the resonance frequency of the CW direction. By subtracting the beat frequency occurring when the resonance frequency of the CCW direction is one longitudinal resonance mode lower than the resonance frequency of the CW direction from the beat frequency occurring when the resonance frequency of the CCW direction is one longitudinal resonance mode higher than the resonance frequency of the CW direction, an output value is produced that is about two times the frequency difference $\Delta f$.

In another exemplary embodiment using two slave lasers, a first slave laser produces a CCW beam that is tuned to a resonance frequency of the CCW direction of the resonator that is at least one longitudinal resonance mode lower than the resonance frequency of the CW direction, and a second slave laser produces another CCW beam that is tuned to a resonance frequency of the CCW direction of the resonator that is at least one longitudinal resonance mode higher than the resonance frequency of the CW direction. By subtracting the beat frequency occurring between the CW beam and the CCW beam from the first slave laser from the beat frequency occurring between the CW beam and the CCW beam from the second slave laser, an output value is produced that is about two times the frequency difference $\Delta f$. Although two laser and three laser configurations of the resonator gyro 50 are described, additional lasers may be incorporated with the resonator gyro 50.

The MFLS assembly 52 comprises an MFLS 58 and an MFLS optics subassembly 60 coupled to an output of the MFLS 58 that routes the modulated light beams to the HCR assembly 54 and provides an optical feedback of the modulated light beams to the MFLS. The MFLS 58 includes, but is not necessarily limited to, the master laser and one or more slave lasers for generating the modulated light beams in response to control signals from the RTE system 56. The HCR assembly 54 comprises-resonator coupling optics 62 (e.g., the recirculator 40 and photodetectors 16, 18 shown in FIG. 1) having an input coupled to the MFLS optics subassembly 60 and a resonator 64 coupled to a first output of the resonator coupling optics 62. The resonator 64 includes the hollow core fiber coil 24 shown in FIG. 1 and circulates a portion of the modulated light beams in counter-propagating directions. The resonator coupling optics 62 provides electrical signals of resonator optical outputs (e.g., intensity measurements of the CW and CCW circulating beams) to the RTE system 56 via a second output. The RTE system 56 comprises a resonance tracking circuit 66 having an input coupled to the second output of the resonator coupling optics 62 and has an output coupled to an input of the MFLS 58, and the RTE system 56 may comprise additional components such as analog-to-digital (A/D) converters and digital-to-analog converters (DACs) for processing signals received from the resonator coupling optics 62 and transmitted to the MFLS 58. The RTE system 56 produces laser frequency control signals for the master and slave lasers and applies a constant offset to the light beams generated by at least one of the slave lasers. The constant offset is preferably based on a longitudinal resonance mode between one resonance center and another resonance center, as detected by the photodetectors 18, 16, of a corresponding light beam.

Figure 3:
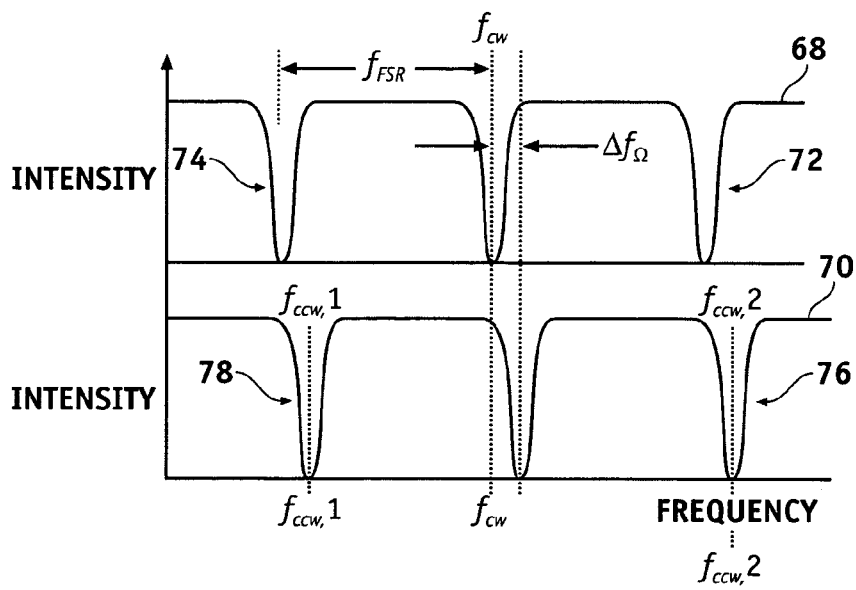
FIG. 3 is a clockwise intensity waveform and a counter-clockwise intensity waveform useful in understanding the resonance tracking system.

FIG. 3 is a clockwise intensity waveform 68 and a counter-clockwise intensity waveform 70 useful in understanding the resonator gyro 50. Referring to FIGS. 2 and 3, in an exemplary embodiment, when the CW beam is tuned to the resonance frequency of the CW direction of the resonator 64, the CW intensity waveform 68 is observed having resonance dips 72, 74 occurring at different longitudinal resonance modes. Similarly, when the CCW beam is tuned to the resonance frequency of the CCW direction of the resonator 64, the CCW intensity waveform 70 is observed having resonance dips 76, 78 occurring at different longitudinal resonance modes. The centers of these resonance dips 72, 74, 76, 78 indicate resonance frequencies at different longitudinal resonance modes.

By tuning the master laser to a CW resonance frequency $f_{cw}$, tuning the first slave laser to a first CCW resonance frequency, $f_{ccw,1}$, that is one longitudinal mode lower than the CW resonance frequency $f_{cw}$ at zero rotation rate of the resonator gyro 50, and tuning the second slave laser to a second CCW resonance frequency, $f_{ccw,2}$, that is one longitudinal mode higher the CW resonance frequency $f_{cw}$ at zero rotation rate of the resonator gyro 50, a first beat frequency $\Delta f_1$ is produced between the master laser and the first slave laser and a second beat frequency $\Delta f_2$ is produced between the master laser and the second slave laser. These beat frequencies include both the frequency shift ($\Delta f_\Omega$) due to a rotation of the resonator gyro 50 and the FSR such that $$\Delta f_1 = f_{cw} - f_{ccw,1} = f_{FSR} - \Delta f_\Omega,$$

$$\Delta f_2 = f_{cw} - f_{ccw,2} = f_{FSR} + \Delta f_\Omega.$$

By subtracting the two beat frequencies, $$\Delta f_2 - \Delta f_1 = 2\Delta f_\Omega,$$

a rotation measurement is obtained without FSR and any associated bias and bias instability.

In the two laser exemplary embodiment, the CW beam is locked onto a resonance dip at the resonance frequency $f_{cw}$. The CCW beam is locked onto a resonance dip at the resonance frequency $f_{ccw,1}$, which is one longitudinal mode away from the CW resonance (e.g., has one less wave cycle that fits within the resonator ring) at zero rotation rate of the resonator gyro 50. The frequency spacing, $f_{FSR}$, between adjacent modes is termed the free spectral range. The frequency difference between the CW beam and the CCW beam is the primary measurement output of the resonator gyro 50. Having the FSR as part of the measurement introduces a large bias. Since the FSR depends on the optical pathlength, which can depend on temperature due to thermal expansion, the resulting bias may be unstable due to temperature variations.

The effects of the FSR are removed by switching the relative orientation between the CW and CCW resonance beams. For example, the frequency of CCW beam is periodically switched from the resonance dip that is one longitudinal mode lower (e.g., $f_{ccw,1}$) than the CW resonance to the resonance dip that is one longitudinal mode higher (e.g., $f_{ccw,2}$) than the CW resonance. The CW beam is maintained on the resonance dip at the resonance frequency $f_{cw}$. The beat frequency $\Delta f_1$ (i.e., $f_{cw} - f_{ccw,1} = f_{FSR} - \Delta f_\Omega$) is produced when operating the slave laser at the resonance dip that is one longitudinal mode lower than the CW resonance, and the beat frequency $\Delta f_2$ (i.e., $f_{cw} - f_{ccw,2} = f_{FSR} + \Delta f_\Omega$) is produced when operating the slave laser at the resonance dip that is one longitudinal mode higher than the CW resonance. The FSR can be removed from the measurement by subtracting the beat frequencies. By summing the beat frequencies, the FSR can be obtained and used for implementing frequency switching from CCW resonances at different longitudinal resonance modes.

Figure 4:
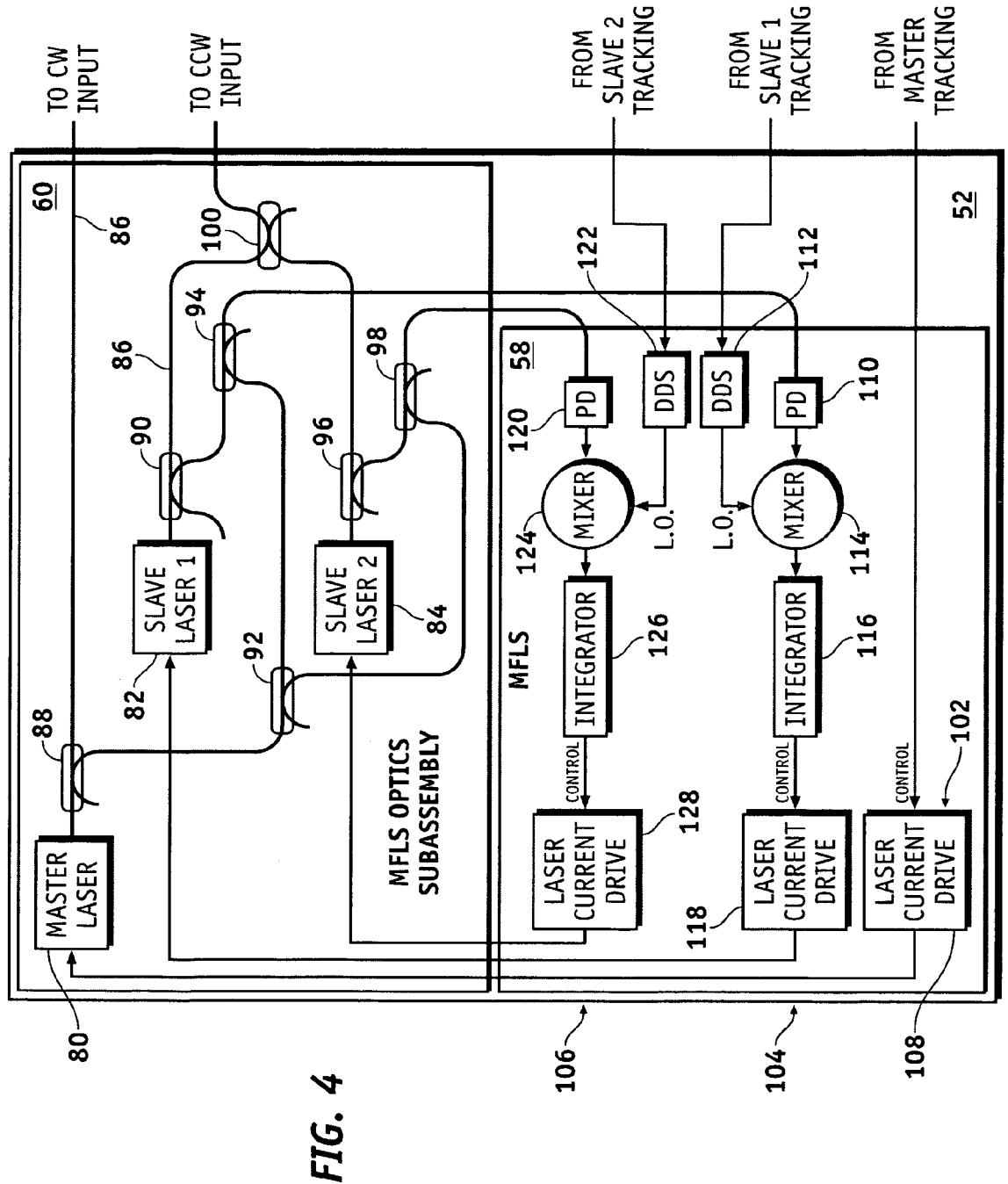
FIG. 4 is a schematic diagram of the multi-frequency laser source assembly shown in FIG. 2.

FIG. 4 is a schematic diagram of the multi-frequency laser source assembly 52 shown in FIG. 2. The MFLS optics subassembly 60 comprises a master laser 80, first and second slave lasers 82, 84, optical couplers 88, 90, 92, 94, 96, 98, 100, and an optical fiber 86 coupled to the outputs of each of the lasers 80, 82, and 84, and between the optical couplers 88, 90, 92, 94, 96, 98, 100. The optical fiber 86 is preferably a polarization maintaining single mode fiber. The master laser 80 produces a CW beam for introduction to the CW input of the resonator 64, and the slave lasers 82, 84 produce CCW beams for introduction to the CCW input of the resonator 64. A portion of each of the CCW beams are combined by the coupler 100 prior to introduction to the CW input of the resonator 64. Some of the optical couplers couple light from the master laser 80 with light from one of the slave lasers 82, 84 to provide feedback for phase locking the slave lasers 82, 84 with the master laser 80. For example, a portion of the CW beam produced by the master laser 80 is mixed with a portion of the CCW beam produced by the first slave laser 82 via the optical couplers 88, 90, 92, and 94, and a portion of the CW beam produced by the master laser 80 is mixed with a portion of the CCW beam produced by the second slave laser 84 via the optical couplers 88, 92, 96, and 98.

This mixed light is provided to the MFLS 58. The MFLS 58 comprises drive circuits 102, 104, and 106 for each of the lasers 80, 82, and 84, respectively. A master drive circuit 102 comprises laser current drive 108 an input configured to receive a master laser control signal from the RTE system 56 and has an output coupled to the master laser 80. A first slave drive circuit 104 comprises a photodetector 110 having an input coupled to the optical coupler 94, a local oscillator having a direct digital synthesizer (DDS) 112 configured to receive a first slave control signal from the RTE system 56, a mixer 114 having a first input coupled to the DDS 112 and a second input coupled to the photodetector 110, an integrator 116 coupled to an output of the mixer 114, and a laser current drive 118 having an input coupled to the integrator 116 and having an output coupled to the first slave laser 82. A second slave drive circuit 106 comprises a photodetector 120 having an input coupled to the optical coupler 98, a local oscillator having a DDS 122 configured to receive a first slave control signal from the RTE system 56, a mixer 124 having a first input coupled to the DDS 122 and a second input coupled to the photodetector 120, an integrator 126 coupled to an output of the mixer 124, and a laser current drive 128 having an input coupled to the integrator 126 and having an output coupled to the second slave laser 84. A portion of the light from the slave lasers 82, 84 is mixed with a portion of the light from the master laser 80 at the photodetectors 110, 120, respectively, to produce signals having the beat frequencies.

The beat frequencies between the master laser 80 and the slave lasers 82, 84 are mixed by the mixers 114, 124 with local oscillator signals from the DDSs 112, 122, respectively, to drive the integrators 116, 126 controlling the slave laser frequencies via an injection current. The local oscillator signals are variable by the DDSs 112, 122 in response to the slave control signals from the RTE system 56.

Figure 5:
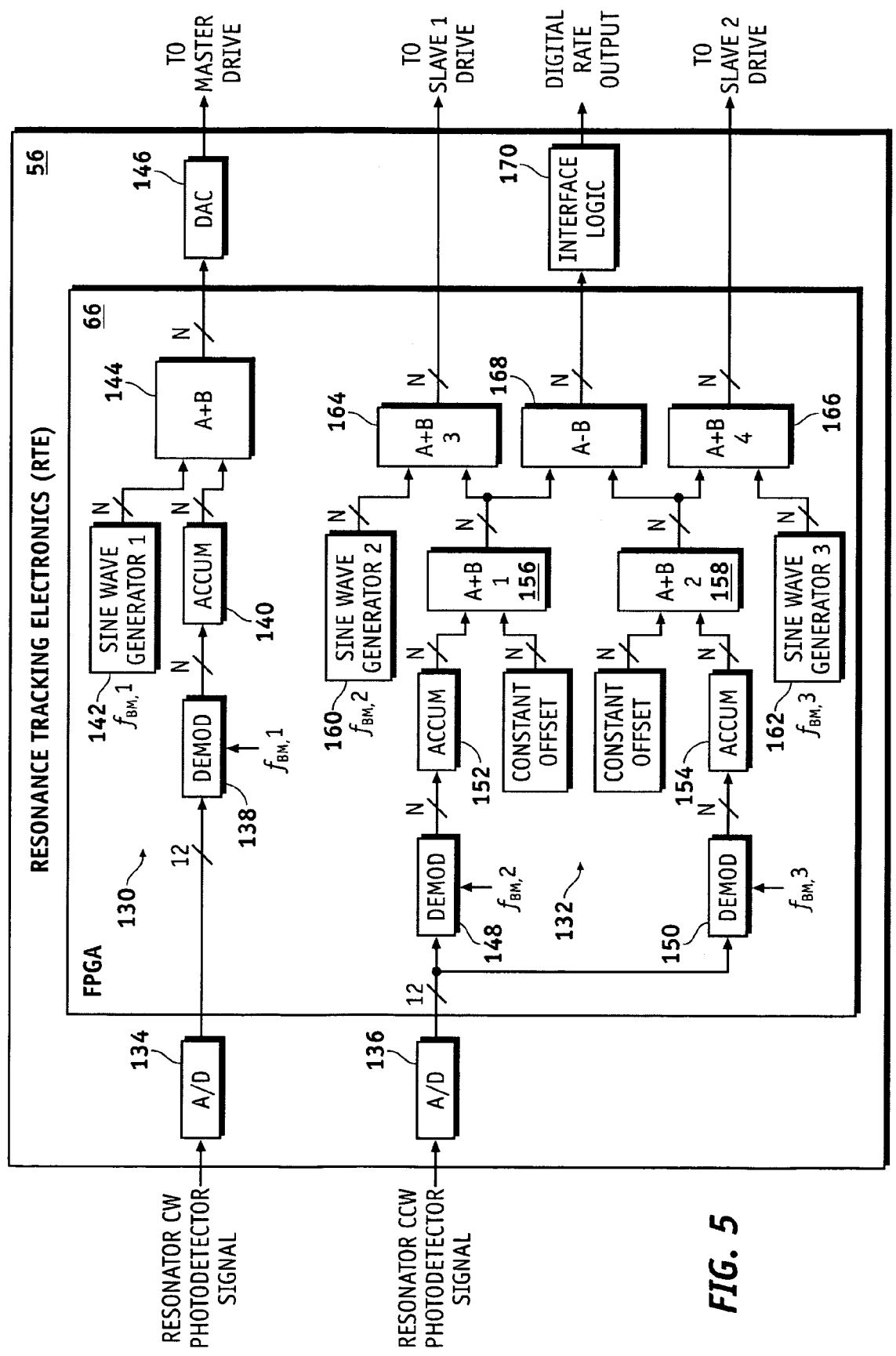
FIG. 5 is a schematic diagram of the resonance tracking electronics system shown in FIG. 2 in accordance with an exemplary embodiment.

FIG. 5 is a schematic diagram of the RTE system 56 shown in FIG. 2 in accordance with an exemplary embodiment. The resonance tracking circuit 66 comprises master and slave tracking subcircuits 130 and 132 for three lasers, such as the master and slave lasers 80, 82, and 84 shown in FIG. 4. In addition to the resonance tracking circuit 66, the RTE system 56 further comprises a first A/D converter 134 coupled to an input of the master tracking circuit 130, a second A/D converter 136 coupled to the slave tracking circuit 132, and a DAC 146 coupled to an output of the master tracking circuit 130. In an exemplary embodiment, the resonance tracking circuit 66 is a field programmable gate array (FPGA) or other like programmable device.

The A/D converter 134 digitizes CW photodetector signals received from the resonator coupling optics 62 (e.g., from the CW photodetector indicating the resonance frequencies of the CW direction of the resonator 64). The master tracking subcircuit 130 comprises a demodulator 138 coupled to the A/D converter 134 and configured to receive the digitized signal of the CW direction of the resonator 64, an accumulator 140 coupled to the demodulator 138, a wave generator 142, and an adder 144 having a first input coupled to the wave generator 142 and having a second input coupled to the accumulator 140. The demodulator 138 demodulates the digitized signal of the CW direction at a predetermined demodulation frequency corresponding to modulation frequency of light beam generated by the master laser 80. The output of the demodulator 138 is accumulated by the accumulator 140, and this accumulated value serves as a control value for the servo for the CW resonance tracking loop 30. The wave generator 142 produces a sine wave having a predetermined frequency. The output of the accumulator 140, which is the control value to lock the master laser 80 onto the CW resonance frequency, is summed with the sine wave at the adder 144. The adder 144 produces a signal, based on the resonance frequency of the CW direction of the resonator 64, having a sine wave portion for modulating over the resonance dip to provide an ac signal at the resonator output indicating the resonance center. The DAC 146 converts the combined signal from the adder 144 to an analog signal for tuning and modulating the master laser 80.

The A/D converter 136 digitizes CCW photodetector signals received from the resonator coupling optics 62 (e.g., from the CCW photodetector indicating the resonance frequencies of the CCW direction of the resonator 64). The slave tracking subcircuit 136 comprises first and second demodulators 148, 150 coupled to the A/D converter 136 and configured to receive the digitized signals of the CCW direction of the resonator 64, accumulators 152, 154, coupled respectively to the demodulators 148, 150, a first adder 156 coupled to the first accumulator 152, a second adder 158 coupled to the second accumulator 154, wave generators 160, 162 configured to produce sine waves having a predetermined frequency, a third adder 164 having a first input coupled to a first wave generator 160 and having a second input coupled to an output of the first adder 156, a fourth adder 166 having a first input coupled to a second wave generator 162 and having a second input coupled to an output of the second adder 158, a subtracter 168 having a first input coupled to the output of the first adder 156 and having a second input coupled to the output of the second adder 158, and an interface logic 170 coupled to an output of the subtracter 168. The output of the A/D converter 136 is demodulated by the demodulators 148, 150 at predetermined demodulation frequencies corresponding to the modulation frequencies of the first and second slave lasers 82, 84, respectively, and accumulated by the accumulators 152, 154, respectively. The first and second adders 156, 158 provide a constant offset (e.g., corresponding to at least one longitudinal resonance mode) to each of the accumulated signals. The output of the first adder 156, which serves as a control signal to lock the first slave laser 82 onto the CCW resonance frequency that is at least one longitudinal resonance mode lower than the CW resonance frequency, is summed with the sine wave from the first wave generator 160 at the first adder 156. The output of the second adder 158, which serves as a control signal to lock the second slave laser 84 onto the CCW resonance frequency that is at least one longitudinal resonance mode higher than the CW resonance frequency, is summed with the sine wave from the second wave generator 162 at the second adder 158. The third adder 164 produces a signal, based on the resonance frequency of the CCW direction (e.g., a first CCW resonance frequency) of the resonator 64 that is at least one longitudinal resonance mode lower than the CW resonance frequency, having a sine wave portion for modulating over the resonance dip to provide an ac signal at the resonator output indicating the resonance center of the first CCW resonance frequency. The fourth adder 166 produces a signal, based on the resonance frequency of the CCW direction (e.g., a second CCW resonance frequency) of the resonator 64 that is at least one longitudinal resonance mode higher than the CW resonance frequency, having a sine wave portion for modulating over the resonance dip to provide an ac signal at the resonator output indicating the resonance center of the second CCW resonance frequency. The third and fourth adders 164, 166 generate frequency signals for each of the slave lasers 82, 84 based on the respective resonance frequencies in the CCW direction (e.g., at least one longitudinal resonance mode lower than the resonance frequency of the CW direction and at least one longitudinal resonance mode higher than the resonance frequency of the CW direction). The outputs of the first and second adders 156, 158 are differenced at the subtracter 168 to produces a signal corresponding to two times the frequency difference due to the rotational rate of the resonator 64.

Figure 6:
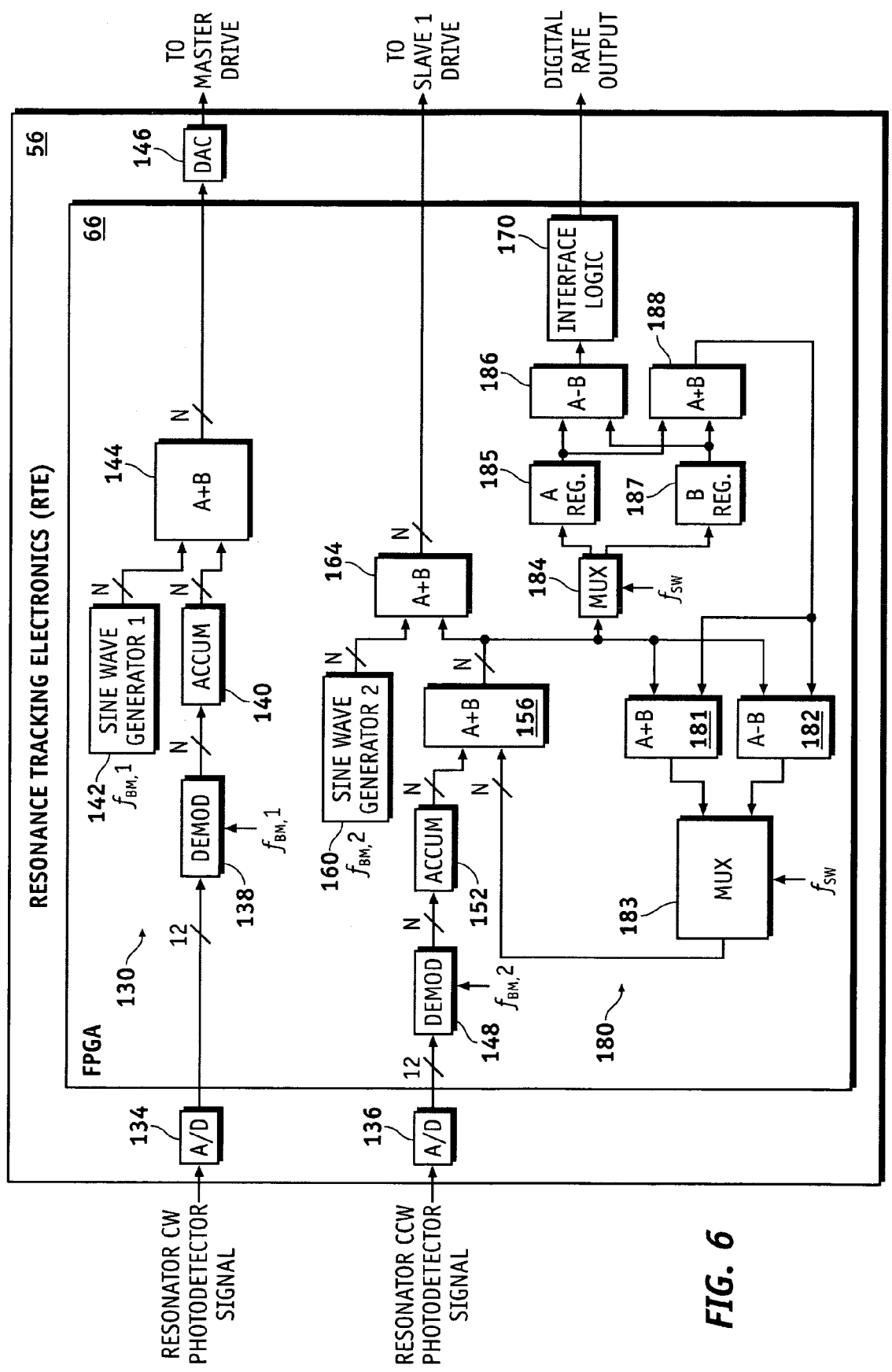
FIG. 6 is a schematic diagram of the resonance tracking electronics system shown in FIG. 2 in accordance with another exemplary embodiment.

FIG. 6 is a schematic diagram of the RTE system 56 shown in FIG. 2 in accordance with another exemplary embodiment. The resonance tracking circuit 66 comprises the tracking subcircuits 130 and 180 for two lasers, the master tracking subcircuit 130 for the master laser 80 and a slave tracking subcircuit 180 for the slave laser 82. In this exemplary embodiment, the slave tracking subcircuit 180 is configured to switch between the CCW resonance frequency (e.g., the first CCW resonance frequency) on one longitudinal mode lower than the CW resonance frequency and the CCW resonance frequency (e.g, the second CCW resonance frequency) on one longitudinal mode higher than the CW resonance frequency.

The CCW resonator signal is digitized by the A/D converter 136. The slave tracking subcircuit 180 comprises the resonance tracking components (e.g., the demodulator 148, the accumulator 152, the adder 156, the wave generator 160, and the adder 164 shown in FIG. 5) for the first slave laser 82. Additionally, the slave tracking subcircuit 180 comprises a multiplexer 184 having an input coupled to the output of the adder 156, registers 185, 187 coupled to the output of the multiplexer 184, a subtracter 186 having a first input coupled to the first register 185 and a second input coupled to the second register 187, an adder 188 having a first input coupled to the first register 185 and a second input coupled to the second register 187, the interface logic 170 coupled to an output of the subtracter 186, an adder 181 having a first input coupled to the output of the adder 156 and a second input coupled to the output of the adder 188, a subtracter 182 having a first input coupled to the output of the adder 156 and a second input coupled to the output of the adder 188, and a multiplexer 183 having a first input coupled to an output of the adder 181, a second input coupled to an output of the subtracter 182, and an output coupled to the second input of the adder 156.

The output of the A/D converter 136 is demodulated by the demodulator 148, then accumulated at the accumulator 152, and the accumulated signal serves at the servo for the CCW resonance tracking loop (e.g., based on the slave laser 82, or CCW laser). The output of the accumulator 152 is then summed at the adder 156 with a value that determines which resonance the CCW laser is locked to relative to the CW resonance. The output of the adder 156, which is the control signal for locking the CCW laser 82 onto a CCW resonance (e.g., the first or second CCW resonance frequency), is then summed with a sine wave from sine wave generator 160 at the adder 164. The sine wave is used for modulating over the CCW resonance dip to provide a sinusoidal signal at the resonator output that indicates the resonance center. The output of the adder 164 is used to tune the frequency of the CCW laser 82.

The output of the adder 156, which is a digital value that represents the frequency difference between the CW laser 80 and the CCW laser 82, and thus the CW and CCW resonances, is sent to the multiplexer 184 which is switched at a switching frequency $f_{sw}$. This switching frequency $f_{sw}$ is also the frequency that the CCW light beam is switched between the two resonance frequencies. Depending on the state of the switching signal at $f_{sw}$, the output of the multiplexer 184 is sent to either a first register 185 (A) or a second register 187 (B). Register A 185 holds the value representing the frequency difference between the CW resonance frequency and the first CCW resonance frequency and register B 187 holds the value representing the frequency difference between the second CCW resonance frequency and the CW resonance frequency. The output of these two registers 185, 187 is then differenced at the subtracter 186 to produce an output value representing two times the frequency difference due to the rotation of the resonator 64. This output value is the output of the resonator gyro and excludes the FSR. The output of the two registers 185 and 187 are also summed at the adder 188 to produce an output value representing two times the FSR. The output of the adder 188 is then sent to the adder 181 and the subtracter 182. At the adder 181, the FSR value is summed with the control signal from the adder 156. The output of adder 181 represents the current locked CCW resonance frequency plus two times the FSR. At the subtracter 182, the FSR value is subtracted from the control signal from the adder 156. The output of the subtracter 182 represents the current locked CCW resonance frequency minus two times the FSR.

The outputs of the adder 181 and the subtracter 182 are time multiplexed into a single channel by the multiplexer 183, which is switched at frequency $f_{sw}$. The output value of the multiplexer 183 is added to the output of the accumulator 152 at the adder 156. In effect, the CCW laser 82 is switched from the resonance dip corresponding to the first CCW resonance frequency to the resonance dip corresponding to the second CCW resonance frequency by switching the multiplexer 183 output from the output of the subtracter 182 to the output of the adder 181. After a half period associated with the switching frequency $f_{sw}$, the CCW laser 82 is switched back to the resonance dip corresponding to the first CCW resonance frequency by switching the multiplexer 183 output from the output of the adder 181 to the output of the subtracter 182.

Since the CCW laser frequency has a finite slew rate, the switching from one resonance frequency to the other occurs over a finite time. During the transition time, an erroneous signal may occur at the CCW photodetector and the A/D converter 136. The effects of the erroneous signal can be removed by gating out the corrupted A/D samples before being processed by the demodulator 148. The gating can be done in several ways. One method is to sample and hold the A/D converter 136 from making conversions during the gate period. The gate period may be selected such that the errors due to switching have decreased to acceptable levels.

The switching frequency $f_{sw}$ that the CCW laser 82 is switched may be selected so that the gate period associated with the removing transition errors is not significant compared to the complete measurement cycle at the switching frequency $f_{sw}$. The switching frequency is preferably selected to be higher than the frequency content of the FSR for satisfactory removal of the FSR from the rotation measurement. Since the FSR variations are mostly thermally driven, the FSR should change slowly to provide for a relatively high thermal time constant for the resonator 64.

A high performance fiber resonator gyro may have a rotation rate sensitivity of roughly 10 deg/hr/Hz. To obtain a bias of less then 0.01 deg/hr due to residual FSR frequency error, the residual FSR frequency error should be 0.001 Hz. For a high performance fiber resonator, the FSR should be roughly 100 MHz. The switching frequency may be selected to maintain the residual FSR errors at acceptable levels and provide some temperature stability to the resonator gyro. However, the maximum switching frequency is determined by the slew rate of the laser frequency tuning.

Figure 7:
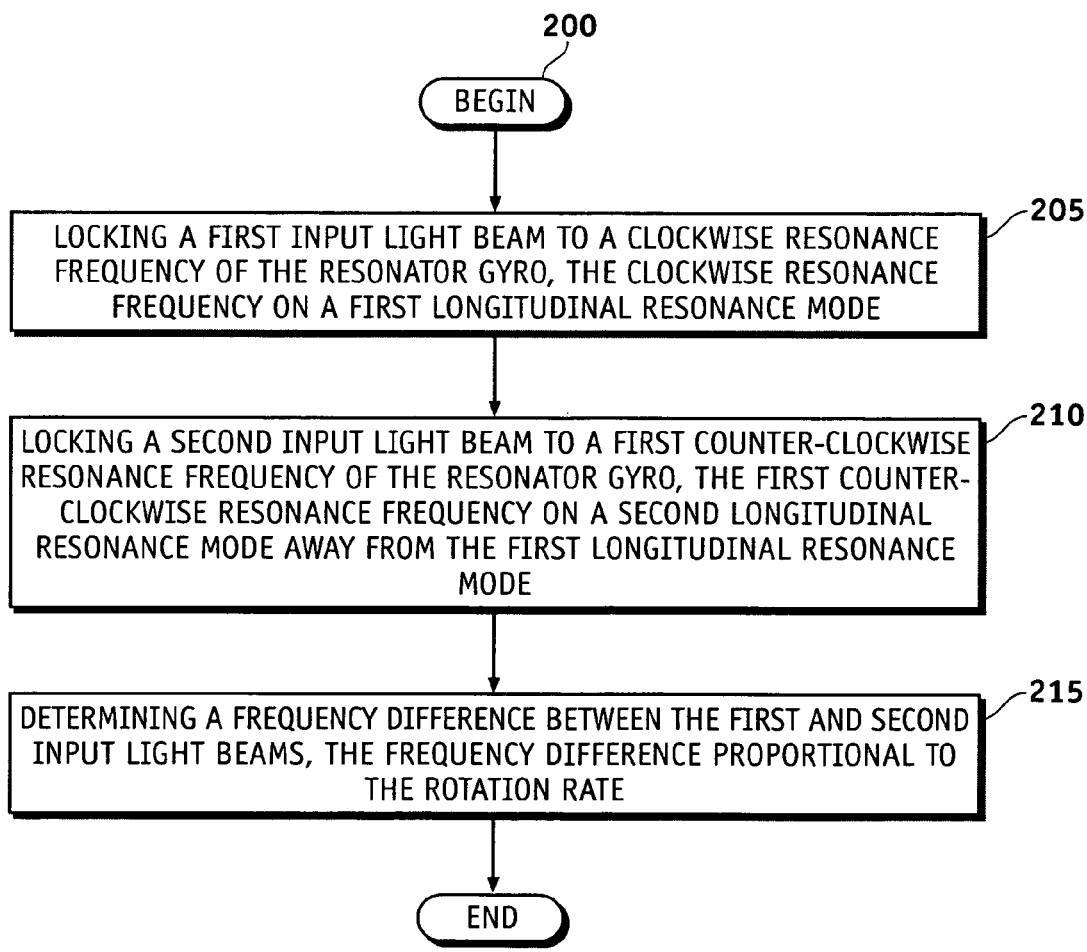
FIG. 7 is a flow diagram of a method for stabilizing light sources in a resonator gyro in accordance with an exemplary embodiment of the present invention.

FIG. 7 is a flow diagram of a method for stabilizing light sources in a resonator gyro in accordance with an exemplary embodiment of the present invention. The method begins at step 200. A first light beam circulating in a first counter-propagating direction (e.g., CW) of the resonator gyro is tuned to a resonance frequency (e.g., a first resonance frequency) of the first counter-propagating direction. The first resonance frequency has a first longitudinal resonance mode. The tuning of the first light beam may be accomplished by driving a first light source at the first resonance frequency. A second light beam circulating in a second counter-propagating direction (e.g., CCW) of the resonator gyro is tuned to a frequency (e.g., a second resonance frequency) corresponding to at least one longitudinal resonance mode away (e.g., a second longitudinal resonance mode) from the first longitudinal resonance mode. The tuning of the second light beam may be accomplished by driving a second light source at the second resonance frequency. Additionally, each of the first and second input light beams may be modulated at a frequency that is substantially greater (e.g., at least about four times greater) than the loop unity gain frequency of the resonator gyro. The first input light beam is locked to the first resonance frequency at step 205. The second input light beam is locked to the second resonance frequency at step 210. A frequency difference between the frequency of the first input light beam and the second input light beam is determined at step 215, and the frequency difference is proportional to the rotation rate of the resonator gyro. Additionally in one exemplary embodiment, the second longitudinal resonance mode is switched between one longitudinal resonance mode lower than the first longitudinal resonance mode and one longitudinal resonance mode higher than the first longitudinal resonance mode. A first frequency shift is determined between the first resonance frequency and the second resonance frequency when the second longitudinal resonance mode is at least one longitudinal resonance mode lower than the first longitudinal resonance mode, and a second frequency shift is determined between the first resonance frequency and the second resonance frequency when the second longitudinal resonance mode is at least one longitudinal resonance mode higher than the first longitudinal resonance mode. The first frequency shift is subtracted from the second frequency shift to produce an output proportional to two times the frequency difference. In another exemplary embodiment, the second input light beam is locked to the second resonance frequency having the at least one longitudinal resonance mode lower than the first longitudinal resonance mode, and a third input light beam (e.g., produced from a third light source) is locked to the second resonance frequency having the at least one longitudinal resonance mode higher than the first longitudinal resonance mode. A first frequency shift is determined between the first resonance frequency and the second resonance frequency having the at least one longitudinal resonance mode lower than the first longitudinal resonance mode, and a second frequency shift is determined between the first resonance frequency and the second resonance frequency having the at least one longitudinal resonance mode higher than the first longitudinal resonance mode. The first frequency shift is subtracted from the second frequency shift to produce an output proportional to two times the frequency difference due to a rotation of the resonator gyro.

The resonator gyros 10 and 50 are suited to a variety of applications including, by way of example and not of limitation, applications requiring inertial guidance such as aircraft, land vehicle, submarine, satellite, surface ship navigation, and the like. In addition, the relatively small size envisioned for the resonator gyros 10 and 50 would enable a practical usage on very small platforms including, by way of example and not of limitation, small robots, individual soldier footwear, and small-scale satellites.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A resonator gyro comprising:
    a first light source configured to produce a first input light having a first frequency;
    a second light source configured to produce a second input light having a second frequency;
    a resonator coupled to said first and second light sources, said resonator having first and second counter-propagating directions and comprising an optical fiber coil having a hollow core, said resonator configured to:
        circulate a first circulating light through said hollow core in said first counter-propagating direction, said first circulating light based on a portion of said first input light; and
        circulate a second circulating light through said hollow core in a second counter-propagating direction, said second circulating light based on a portion of said second input light;
    a resonance detection circuit coupled to said resonator and comprising:
        a first photodetector configured to sample light from said first circulating light;
        a second photodetector configured to sample light from said second circulating light;
        a first resonance detection circuit coupled to said first photodetector and configured to detect a resonance center of said first counter-propagating direction; and
        a second resonance detection circuit coupled to said second photodetector and configured to detect a resonance center of said second counter-propagating direction;
    a controller coupled to said resonance detection circuit and said first and second light sources, said controller comprising:
        a first servo having an input coupled to said first resonance detection circuit and having an output coupled to said first light source; and
        a second servo having an input coupled to said second resonance detection circuit and having an output coupled to said second light source;
    wherein said controller is configured to:
        tune said first frequency to said resonance frequency of said first counter-propagating direction; and
        tune said second frequency to said resonance frequency of said second counter-propagating direction, a difference between said resonance frequencies of said first and second counter-propagating directions proportional to a rotational rate of the resonator gyro;

wherein said first input light has a first modulation frequency and said second input light has a second modulation frequency, and wherein the resonator gyro further comprises:

a first tracking loop based on said first light source, said resonator, said first photodetector, said first resonance detection circuit, and said first servo, said first tracking loop having a first unity gain frequency, said first modulation frequency at least four times greater than said first unity gain frequency; and a second tracking loop based on said second light source, said resonator, said second photodetector, said second resonance detection circuit, and said second servo, said second tracking loop having a second unity gain frequency, said second modulation frequency at least four times greater than said second unity gain frequency.

2. A resonator gyro according to claim 1, wherein said resonance detection circuit is further configured to:

produce a first error signal when said first frequency deviates from said resonance frequency of said first counter-propagating direction; and produce a second error signal when said second frequency deviates from said resonance frequency of said second counter-propagating direction; and wherein said controller is further configured to:

tune said first frequency to said resonance frequency of said first counter-propagating direction in response to said first error signal; and tune said second frequency to said resonance frequency of said second counter-propagating direction in response to said second error signal.

3. A resonator gyro according to claim 1, wherein said controller is further configured to:

lock said first circulating light onto a first resonance center at said resonance frequency of said first counter-propagating direction; and lock said second circulating light onto a second resonance center at said resonance frequency of said second counter-propagating direction, said resonance frequency of said first counter-propagating direction at least one longitudinal mode away from said resonance frequency of said second counter-propagating direction at a zero rotation rate of the resonator gyro.

4. A resonator gyro according to claim 3, wherein said controller is further configured to switch said resonance frequency of said second counter-propagating direction between at least one longitudinal mode lower than said resonance frequency of said first counter-propagating direction and at least one longitudinal mode higher than said resonance frequency of said second counter-propagating direction.

5. A resonator gyro according to claim 1, wherein said first resonance detection circuit comprises:

an analog-to-digital (A/D) converter coupled to first photodetector and configured to produce a digitized signal from said sampled light of said first photodetector;

a demodulator coupled to said A/D converter and configured to produce a demodulated signal based on said digitized signal;

an accumulator coupled to said demodulator and configured to produce an accumulated signal from said demodulated signal;

a wave generator configured to produce a sine wave;

an adder having a first input coupled to said wave generator and a second input coupled to said accumulator, said adder configured to produce a summed signal from said accumulated signal and said sine wave, said summed signal having a sine wave portion for modulating said first input light; and a digital-to-analog converter (DAC) coupled to said adder and configured to produce an analog signal from said summed signal.

6. A resonator gyro according to claim 1, wherein said second resonance detection circuit comprises:

an analog-to-digital (A/D) converter coupled to second photodetector and configured to produce a digitized signal from said sampled light of said second photodetector;

a demodulator coupled to said A/D converter and configured to produce a demodulated signal based on said digitized signal;

an accumulator coupled to said demodulator and configured to produce an accumulated signal from said demodulated signal;

a first adder having a first input coupled to said accumulator and a second input configured to receive a value determining said resonance frequency of said second counter-propagating direction, said first adder configured to produce a control signal from said accumulated signal and said value;

a wave generator configured to produce a sine wave; and a second adder having a first input coupled to said wave generator and a second input coupled to said first adder, said second adder configured to produce a second summed signal from said control signal and said sine wave, said second summed signal indicating said difference between said resonance frequencies of said first and second counter-propagating directions, said second summed signal having a sine wave portion for modulating said second input light.

7. A resonator gyro according to claim 6, wherein said second resonance detection circuit further comprises:

a first multiplexer coupled to said first adder and configured to switch between first and second states at a switching frequency;

a first register coupled to said first multiplexer and configured to receive a first value indicating a first frequency difference between said resonance frequency of said second counter-propagating direction and said resonance frequency of said first counter-propagating direction during said first state, said resonance frequency of said second counter-propagating direction one longitudinal mode lower than said resonance frequency of said first counter-propagating direction;

a second register coupled to said first multiplexer and configured to receive a second value indicating a second frequency difference between said resonance frequency of said second counter-propagating direction and said resonance frequency of said first counter-propagating direction during said second state, said resonance frequency of said second counter-propagating direction one longitudinal mode higher than said resonance frequency of said first counter-propagating direction; and a first subtracter having a first input coupled to said first register and a second input coupled to said second register, said subtracter configured to produce a first difference value indicating two times a frequency difference due to a rotation of the resonator gyro.

8. A resonator gyro according to claim 7, wherein said second resonance detection circuit further comprises:
   a third adder having a first input coupled to said first register and a second input coupled to said second register, said third adder configured to produce a third summed signal indicating two times a free spectral range (FSR);
   a fourth adder having a first input coupled to said first adder and a second input coupled to said first adder, said fourth adder configured to produce a fourth summed signal indicating a combination of said resonance frequency of said second counter-propagating direction and two times said FSR;
   a second subtracter having a first input coupled to said first adder and a second input coupled to said third adder, said second subtracter configured to produce a second difference value indicating a difference between said resonance frequency of said second counter-propagating direction and two times said FSR; and
   a second multiplexer having a first input coupled to said fourth adder, a second input coupled to said second subtracter, and an output coupled to said first adder, said second multiplexer configured to produce said value determining said resonance frequency of said second counter-propagating direction.

9. A resonator gyro according to claim 1, wherein said controller further comprises:
   a first current drive having an input configured to receive a control signal from said resonance detection circuit and an output coupled to said first light source, said first current drive configured to tune and modulate said first light source based on first control signal;
   a photodetector configured to detect a signal having a beat frequency based on said first and second input light;
   a direct digital synthesizer configured to receive a control value from said resonance detection circuit and further configured to produce an oscillation signal in response to said control value;
   a mixer having a first input coupled to said photodetector, a second input coupled to said direct digital synthesizer, and an output, said mixer configured to produce a mixed signal from said control value and said beat frequency;
   an integrator coupled to said output of said mixer; and
   a second current drive having an input coupled to said integrator and an output coupled to said second light source, said second current drive configured to tune and modulate said second light source based on said control value.

10. A resonator gyro comprising:
   a first light source configured to produce a first input light having a first frequency;
   a second light source configured to produce a second input light having a second frequency;
   a third light source configured to produce a third input light having a third frequency;
   a resonator coupled to said first, second, and third light sources, said resonator having first and second counter-propagating directions, said resonator configured to:
      circulate a first circulating light based on said first input light in said first counter-propagating direction;
      circulate a second circulating light based on said second input light in said second counter-propagating direction; and
      circulate a third circulating light based on said third input light in said second counter-propagating direction;
   a tracking circuit coupled to said resonator and configured to detect a first resonance frequency ($f_1$) of said first counter-propagating direction, a second resonance frequency ($f_2$) of said second counter-propagating direction, and a third resonance frequency ($f_3$) of said second counter-propagating direction, said second resonance frequency ($f_2$) one longitudinal mode lower than said first resonance frequency ($f_1$), said third resonance frequency ($f_3$) at least one longitudinal mode higher than said first resonance frequency ($f_1$), wherein said tracking circuit comprises:
      a photodetector configured to sample light based on said second and third circulating light;
      a demodulator coupled to said photodetector and configured to produce a first demodulated signal based on said second circulating light and a second demodulated signal based on said third circulating light;
      an accumulator coupled to said demodulator and configured to produce a first accumulated signal from said first demodulated signal and a second accumulated signal from said second demodulated signal, said first accumulated signal indicating a first control value to lock said second light source to said second resonance frequency, said second accumulated signal indicating a second control value to lock said third light source to said third resonance frequency;
      a first adder having a first input coupled to said accumulator and having a second input configured to receive a predetermined constant offset, said first adder configured to produce a first summed signal from said predetermined constant offset and said first accumulated signal and further configured to produce a second summed signal from said constant offset and said second accumulated signal;
      a wave generator configured to produce first and second sine waves;
      a second adder having a first input coupled to said wave generator, a second input coupled to said first adder, and an output coupled to said controller, said second adder configured to produce a first control signal from said first summed signal and said first sine wave;
      a third adder having a first input coupled to said wave generator, a second input coupled to said first adder, and an output coupled to said controller, said third adder configured to produce a second signal from said second summed signal and said second sine wave; and
      a subtracter coupled to said first adder and configured to produce a digital rate output of the resonator gyro from a difference of said first and second summed signals, said digital rate output proportional to said rotational rate of the resonator gyro; and
   a controller coupled to said tracking circuit and said first, second, and third light sources, said controller configured to:
      tune said first frequency to said first resonance frequency ($f_1$);
      tune said second frequency to said second resonance frequency ($f_2$); and
      tune said third frequency to said third resonance frequency ($f_3$), wherein $(f_3 - f_1) - (f_1 - f_2) = 2\Delta f$, and $\Delta f$ is a frequency difference proportional to a rotational rate of the resonator gyro.

11. A resonator gyro according to claim 10, wherein said tracking circuit comprises:
a photodetector configured to produce a sample signal based on said first circulating light;
an A/D converter coupled to said photodetector and configured to produce a digitized signal from said sample signal;
a demodulator configured to produce a demodulated signal based on said digitized signal;
an accumulator coupled to said demodulator and configured to produce an accumulated signal from said demodulated signal, said accumulated signal indicating a control value to lock said first light source to said first resonance frequency;
a wave generator configured to produce a sine wave;
an adder having a first input coupled to said wave generator and a second input coupled to said accumulator, said adder configured to produce a summed signal from said sine wave and said accumulated signal, said summed signal having a sine wave portion for modulating said first input light; and
a digital-to-analog converter (DAC) coupled to said adder and configured to produce an analog signal from said summed signal, said controller further configured to tune and modulate said first input light in response to said analog signal.

12. A method for determining a rotation rate of a resonator gyro, the method comprising the steps of:
locking a first input light beam to a clockwise resonance frequency of the resonator gyro, the clockwise resonance frequency on a first longitudinal resonance mode;
locking a second input light beam to a first counter-clockwise resonance frequency of the resonator gyro, the first counter-clockwise resonance frequency on a second longitudinal resonance mode away from the first longitudinal resonance mode;
determining a frequency difference between the first and second input light beams, the frequency difference proportional to the rotation rate; and
modulating the first and second input light beams at a frequency greater than at least four times a loop unity gain frequency of the resonator gyro prior to said determining step.

13. A method according to claim 12 further comprising:
switching the second longitudinal resonance mode between one longitudinal resonance mode lower than the first longitudinal resonance mode and one longitudinal resonance mode higher than the first longitudinal resonance mode;
determining a first frequency shift between the clockwise resonance frequency and the first counter-clockwise resonance frequency when the second longitudinal resonance mode is one longitudinal resonance mode lower than the first longitudinal resonance mode;
determining a second frequency shift between the clockwise resonance frequency and the first counter-clockwise resonance frequency when the second longitudinal resonance mode is one longitudinal resonance mode higher than the first longitudinal resonance mode;
subtracting the first frequency shift from the second frequency shift to produce an output proportional to two times the frequency difference.

14. A method according to claim 12 further comprising:
locking a third input light beam to a second counter-clockwise resonance frequency of the resonator gyro, the second counter-clockwise resonance frequency at least one longitudinal resonance mode higher than the first longitudinal resonance mode, the first counter-clockwise resonance frequency at least one longitudinal resonance mode lower than the first longitudinal resonance mode;
determining a first frequency shift between the clockwise resonance frequency and the first counter-clockwise resonance frequency;
determining a second frequency shift between the clockwise resonance frequency and the second counter-clockwise resonance frequency; and
subtracting the first frequency shift from the second frequency shift to produce an output proportional to two times a frequency difference due to a rotation of the resonator gyro.

15. A resonator gyro comprising:
a first light source configured to produce a first input light having a first frequency;
a second light source configured to produce a second input light having a second frequency;
a resonator coupled to said first and second light sources, said resonator having first and second counter-propagating directions and comprising an optical fiber coil having a hollow core, said resonator configured to:
circulate a first circulating light through said hollow core in said first counter-propagating direction, said first circulating light based on a portion of said first input light; and
circulate a second circulating light through said hollow core in a second counter-propagating direction, said second circulating light based on a portion of said second input light;
a resonance detection circuit coupled to said resonator and comprising:
a first photodetector configured to sample light from said first circulating light;
a second photodetector configured to sample light from said second circulating light;
a first resonance detection circuit coupled to said first photodetector and configured to detect a resonance center of said first counter-propagating direction; and
a second resonance detection circuit coupled to said second photodetector and configured to detect a resonance center of said second counter-propagating direction;
a controller coupled to said resonance detection circuit and said first and second light sources, said controller comprising:
a first servo having an input coupled to said first resonance detection circuit and having an output coupled to said first light source; and
a second servo having an input coupled to said second resonance detection circuit and having an output coupled to said second light source;
wherein said controller is configured to:
tune said first frequency to said resonance frequency of said first counter-propagating direction; and
tune said second frequency to said resonance frequency of said second counter-propagating direction, a difference between said resonance frequencies of said first and second counter-propagating directions proportional to a rotational rate of the resonator gyro;
a first tracking loop based on said first light source, said resonator, said first photodetector, and said first resonance detection circuit, said first tracking loop having a first unity gain frequency, each of said first light source, said first photodetector, said first resonance detection circuit, and said first servo having a control signal bandwidth greater than said first unity gain frequency; and a second tracking loop based on said second light source, said resonator, said second photodetector, and said second resonance detection circuit, said second tracking loop having a second unity gain frequency, each of said second light source, said second photodetector, said second resonance detection circuit, and said second servo having a control signal bandwidth greater than said second unity gain frequency.

16. A resonator gyro comprising:

a first light source configured to produce a first input light having a first frequency;

a second light source configured to produce a second input light having a second frequency;

a resonator coupled to said first and second light sources, said resonator having first and second counter-propagating directions and comprising an optical fiber coil having a hollow core, said resonator configured to:
  circulate a first circulating light through said hollow core in said first counter-propagating direction, said first circulating light based on a portion of said first input light; and
  circulate a second circulating light through said hollow core in a second counter-propagating direction, said second circulating light based on a portion of said second input light;

a resonance detection circuit coupled to said resonator and comprising:
  a first photodetector configured to sample light from said first circulating light;
  a second photodetector configured to sample light from said second circulating light;
  a first resonance detection circuit coupled to said first photodetector and configured to detect a resonance center of said first counter-propagating direction; and
  a second resonance detection circuit coupled to said second photodetector and configured to detect a resonance center of said second counter-propagating direction, said second resonance detection circuit comprising:
    an analog-to-digital (A/D) converter coupled to second photodetector and configured to produce a digitized signal from said sampled light of said second photodetector;
    a demodulator coupled to said A/D converter and configured to produce a demodulated signal based on said digitized signal;
    an accumulator coupled to said demodulator and configured to produce an accumulated signal from said demodulated signal;
    a first adder having a first input coupled to said accumulator and a second input configured to receive a value determining said resonance frequency of said second counter-propagating direction, said first adder configured to produce a control signal from said accumulated signal and said value;
    a wave generator configured to produce a sine wave; and
    a second adder having a first input coupled to said wave generator and a second input coupled to said first adder, said second adder configured to produce a second summed signal from said control signal and said sine wave, said second summed signal indicating said difference between said resonance frequencies of said first and second counter-propagating directions, said second summed signal having a sine wave portion for modulating said second input light; and a controller coupled to said resonance detection circuit and said first and second light sources, said controller configured to:
  tune said first frequency to said resonance frequency of said first counter-propagating direction; and
  tune said second frequency to said resonance frequency of said second counter-propagating direction, a difference between said resonance frequencies of said first and second counter-propagating directions proportional to a rotational rate of the resonator gyro.

17. A resonator gyro comprising:

a first light source configured to produce a first input light having a first frequency;

a second light source configured to produce a second input light having a second frequency;

a resonator coupled to said first and second light sources, said resonator having first and second counter-propagating directions and comprising an optical fiber coil having a hollow core, said resonator configured to circulate light based on said first and second input light through said hollow core in said first and second counter-propagating directions;

a resonance detection circuit coupled to said resonator and configured to detect a resonance frequency for each of said first and second counter-propagating directions; and a controller coupled to said resonance detection circuit and said first and second light sources, said controller configured to:
  tune said first frequency to said resonance frequency of said first counter-propagating direction; and
  tune said second frequency to said resonance frequency of said second counter-propagating direction, a difference between said resonance frequencies of said first and second counter-propagating directions proportional to a rotational rate of the resonator gyro;
wherein said controller comprises:
  a first current drive having an input configured to receive a control signal from said resonance detection circuit and an output coupled to said first light source, said first current drive configured to tune and modulate said first light source based on first control signal;
  a photodetector configured to detect a signal having a beat frequency based on said first and second input light;
  a direct digital synthesizer configured to receive a control value from said resonance detection circuit and further configured to produce an oscillation signal in response to said control value;
  a mixer having a first input coupled to said photodetector, a second input coupled to said direct digital synthesizer, and an output, said mixer configured to produce a mixed signal from said control value and said beat frequency;
  an integrator coupled to said output of said mixer; and
  a second current drive having an input coupled to said integrator and an output coupled to said second light source, said second current drive configured to tune and modulate said second light source based on said control value.

* * * * *